United States Patent [19]

Clark et al.

[11] Patent Number: 5,232,683
[45] Date of Patent: Aug. 3, 1993

[54] CRYSTALLINE ALUMINOPHOSPHATES AND RELATED COMPOUNDS

[75] Inventors: David M. Clark; Bettina Kraushaar-Czarnetzki; Ronald J. Dogterom, all of Amsterdam, Netherlands

[73] Assignee: Shell Oil Company, Houston, Tex.

[21] Appl. No.: 783,027

[22] Filed: Oct. 25, 1991

[30] Foreign Application Priority Data

Nov. 2, 1990 [GB] United Kingdom ............... 9023847

[51] Int. Cl.$^5$ .............................................. C01B 33/34
[52] U.S. Cl. ...................................... 423/708; 423/718; 423/DIG. 30; 502/77; 502/208; 502/214
[58] Field of Search ............... 423/305, 306, 326, 328, 423/329, 708, 718, DIG. 30; 502/208, 214, 77

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,877,593 | 10/1989 | Valyocsik | 502/208 |
| 5,045,293 | 9/1991 | Clark et al. | 502/208 |
| 5,051,246 | 9/1991 | Clark et al. | 502/208 |
| 5,102,642 | 4/1992 | Clark et al. | 502/208 |

FOREIGN PATENT DOCUMENTS

| | | |
|---|---|---|
| 146389 | 6/1985 | European Pat. Off. |
| 344837 | 5/1988 | European Pat. Off. |
| 89/08608 | 2/1989 | PCT Int'l Appl. |

OTHER PUBLICATIONS

Wilson et al. "Aluminophosphate Molecular Sieves: A New Class of Microporous Crystalline Inorganic Solids" Intrazeolite Chemistry 1983, pp. 79–106.

Primary Examiner—R. Bruce Breneman

[57] ABSTRACT

Crystalline aluminophosphates and related compounds having in the as-synthesized dried form the chemical composition expressed as

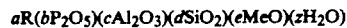

$$aR(bP_2O_5)(cAl_2O_3)(dSiO_2)(eMeO)(zH_2O)$$

wherein R represents a diamine of the general formula

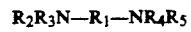

$$R_2R_3N-R_1-NR_4R_5$$

wherein $R_1$ represents a $C_8$–$C_{14}$ carbon chain which may contain one or more inert substituents and each of $R_2$, $R_3$, $R_4$ and $R_5$ represents a hydrogen atom or an alkyl group which may contain one or more inert substituents and Me represents a divalent metal moiety, wherein:

a:b=0.5–1
(c+e):b=0.5–0.9
d:b=0–0.25
(c+e):a=0.8–1.2 and
z:b at least 0.1.

The compounds can be prepared from a forming solution or gel comprising a source of aluminum, a source of phosphorus, a source of a diamine as defined hereinabove and optionally a source of at least one metal moiety MeO, wherein the appropriate forming components are initially present in specific molar ratios and which mixture is kept at elevated temperature for a period of time sufficient to produce a crystalline aluminophosphate or related compound, followed by separating off the crystalline product obtained and drying, and which may subsequently be calcined.

18 Claims, No Drawings

CRYSTALLINE ALUMINOPHOSPHATES AND RELATED COMPOUNDS

FIELD OF THE INVENTION

The present invention relates to novel crystalline aluminophosphate compositions and a process for preparing such aluminophosphate compositions.

BACKGROUND OF THE INVENTION

Crystalline aluminophosphate compositions are well known materials which find a promising reception in industry as new generations of molecular sieves, catalysts carriers, and catalysts. For instance, in U.S. Pat. No. 4,310,440 the preparation of various crystalline aluminophosphates is described from reaction mixtures containing inter alia organic structure directing or templating agents including tetrapropylammonium hydroxide, quinuclidine, t-butylamine and ethylenediamine.

Classes of these materials comprise compositions crystallised in the $AlPO_4$, $SAPO_4$ (siliconaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of specific molar ratios of the appropriate forming components utilizing certain organic diamines.

SUMMARY OF THE INVENTION

The present invention therefore relates to crystalline aluminophosphates and related compounds having in the as-synthesised dried form a chemical composition expressed as:

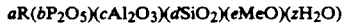

$$aR(bP_2O_5)(cAl_2O_3)(dSiO_2)(eMeO)(zH_2O)$$

wherein a is 0.5-1, b is 1, c is 0.4-0.95, preferably 0.5-0.95, d is 0-0.25, e is 0-0.4 and z is at least 0.1, preferably at least 0.2, and wherein R represents a diamine of the general formula

$$R_2R_3N-R_1-NR_4R_5$$

wherein $R_1$ represents a $C_8$-$C_{14}$ carbon chain which may contain one or more inert substituents and each of $R_2$, $R_3$, $R_4$ and $R_5$ represents a hydrogen atom or an alkyl group which may contain one or more inert substituents such as, for example fluoride, and Me represents a divalent metal moiety, wherein a:b=0.5-1
(c+e):b=0.5-0.9
d:b=0-0.25
(c+e):a=0.8-1.2 and
z:b at least 0.1.

In particular, the present invention relates to aluminophosphates and related compounds having the chemical composition as described hereinabove, wherein a:b=0.5-1
(c+e):b=0.5-0.8
d:b=0-0.25
(c+e):a=0.8-1.2 and
z:b at least 0.2.

DESCRIPTION OF THE PREFERRED EMBODIMENTS

The aluminophosphates and related compounds according to the present invention appear to possess a layered structure wherein the interlayer distances and the unit cell dimensions vary to some extent depending on the chain length of the diamine applied.

Particularly preferred organic diamine compounds within the scope of the present invention comprise those wherein $R_1$ represents a $C_8$-$C_{12}$ carbon chain, in particular a $C_8$ carbon chain, and each of $R_2$, $R_3$, $R_4$ and $R_5$ represents a hydrogen atom or a lower alkyl group. In particular, preference is given to 1,8-diaminooctane. It should be noted that the nitrogen atoms of the appropriate diaminoalkane each may carry a further hydrogen atom or lower alkyl group, i.e., $C_1$-$C_4$, which necessitates the presence of anion(s) to cause electroneutrality.

As divalent metal moiety Me can suitably be used one or more of beryllium, magnesium, manganese, iron, cobalt, zinc, nickel and chromium. Typically, said metal will be one or more of magnesium, manganese, iron, cobalt, zinc and nickel and preferably one or more of magnesium, manganese, cobalt and zinc. The presence of a divalent metal moiety in the novel compounds according to the present invention is optional, i.e. the value of e in the general formula as given hereinbefore can be zero. Normally, the percentage of e in the sum of c+e will not be more than 30%, suitably not more than 20%. In the event that e>0 it will be appreciated that the as-synthesised form of the crystalline aluminophosphates and related compounds according to the present invention also contains an appropriate charge-balancing cation such as a proton or a protonic form of R as described hereinbefore.

It is well known to those skilled in the art that as-synthesised forms of crystalline aluminophosphates can contain traces of counterions originating from precursors of $P_2O_5$, $Al_2O_3$, $SiO_2$ or MeO and/or traces of impurities.

SCS-22 is an example of a novel crystalline aluminophosphate according to the present invention which has been synthesised using 1,8-diaminooctane as template/structure directing agent. The characteristic lines of its X-ray diffraction pattern are given in Table I. When use is made of 1,10-diaminodecane an SCS-22 type compound having the characteristic lines in its X-ray diffraction pattern as listed in Table II is obtained and when use is made of 1,12-diaminododecane an SCS-22 type compound having the characteristic lines of its X-ray diffraction pattern as listed in Table III is obtained.

The present invention also relates to novel crystalline aluminophosphates and related compounds which are substantially in the calcined, R-free form. Such compounds can be obtained by drying the as-synthesised materials and subjecting the dried materials to an appropriate calcination to remove the template/structure directing agent substantially or totally.

The present invention also relates to a process for preparing novel crystalline aluminophosphates as well as related compounds as defined hereinbefore from a forming solution or gel comprising a source of aluminum, a source of phosphorus, optionally a source of at least one metal moiety MeO, and a source of a diamine as defined hereinbefore, which mixture is kept at elevated temperature for a period of time sufficient to produce a crystalline aluminophosphate or related compound followed by separating off the crystalline product obtained and drying, in which solution or gel the various components are initially present in the following molar ratios:

$R:Al_2O_3 = 0.1-3$
$MeO:Al_2O_3 = 0-2$
$P_2O_5:Al_2O_3 = >1.3$ and
$H_2O:Al_2O_3 = 40-500$, wherein Me and R have the meanings as defined hereinbefore.

The crystalline aluminophosphates and related compounds according to the present invention are preferably prepared from a forming solution or gel in which the various components are initially present in the following molar ratios:

$R:Al_2O_3 = 0.15-2$
$MeO:Al_2O_3 = 0-2$
$P_2O_5:Al_2O_3 =$ at least 1.5 and up to about 2.5
$H_2O:Al_2O_3 = 45-350$.

Crystalline aluminophosphates and related compounds according to the present invention having in the as-synthesised form an X-ray diffraction pattern containing at least the lines as given in Table I, II or III are suitably prepared from forming solutions or gels while keeping the temperature below about 200° C., in particular at a temperature in the range of from about 100° C. to about 200° C., most preferably in the range between about 110° C. and about 180° C. The use of aqueous forming solutions or gels is preferred.

For preparing the forming solution or gel, any source or promoter form based on a diamine as defined hereinbefore can be used as template and/or structure directing agent, such as a quaternary ammonium compound of such diamine, which source or promoter should be such that it can be converted into the appropriate diamine.

The process according to the present invention can be carried out at autogenous pressure as well as at an elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between about 6 hours and about 144 hours, in particular between 24 and 96 hours.

Examples of suitable aluminum sources comprise aluminum oxides such as gamma and beta aluminas, hydroxides as well as mixtures thereof, such as gibbsite, boehmite and pseudo-boehmite or aluminum alkoxides, such as aluminum tri-isopropoxide.

Suitable phosphorus sources comprise phosphorus acids and derivatives thereof such as esters, phosphorus oxides, phosphates and phosphites, preferably phosphoric acids. Also mixtures of phosphorus sources can be applied.

Examples of suitable precursors of MeO comprise the appropriate chlorides, iodides, bromides, nitrates, sulphates and acetates.

Advantageously, during crystallization, it has been found that agitation, e.g. rotation, can be applied to produce the desired crystalline aluminophosphates or related compounds from the forming solution or gel.

It should be noted that the expression "dried" as referred to in this specification should be understood to mean removal of physically adsorbed water. Normally, such removal will be achieved by exposing the as-synthesised material to a temperature regime of about 120° C. for a period of time sufficient to substantially remove said water. Normally, such removal is achieved with a period of between 3 and 12 hours.

The novel crystalline aluminophosphates and related compounds according to the present invention can be suitably used as molecular sieves, as catalysts or as catalyst carriers in the operation of various catalytic processes.

If desired, one or more (catalytically) active species, in particular protons and/or precursors thereof and/or one or more metal(s) (compounds) of Group III and/or the Transition Metals and/or Rare Earth Metals and/or precursors thereof, can be incorporated into the crystalline aluminophosphates and related compounds according to the present invention.

They can be incorporated by well-known techniques such as, for example, impregnation and ion-exchange.

The invention will now be illustrated by the following Examples.

EXAMPLE I

A crystalline SAPO, referred to as SCS-22, was prepared by mixing 10.2 grams of aluminum tri-isopropoxide, 1.6 grams of silica-sol (Ludox AS), 11.5 grams of 85% $H_3PO_4$, 7.2 grams of C8DN (1,8-diaminooctane) and 66.6 grams of water giving a reaction gel mixture (on a molar basis) of $0.2SiO_2:0.5Al_2O_3:1P_2O_5:1C8DN:80H_2O$.

This mixture was kept at 140° C. for a period of 72 hours until a crystalline compound was obtained. After synthesis, the crystalline compound produced was separated from the reaction mixture by filtration, water washed and dried at 120° C.

The crystalline compound obtained has the following chemical composition, wherein R represents C8DN:

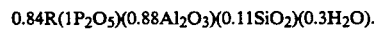

$0.84R(1P_2O_5)(0.88Al_2O_3)(0.11SiO_2)(0.3H_2O)$.

The characterizing lines of its X-ray diffraction pattern are found within the ranges given in Table I below (vs=very strong; vw=very weak; w=weak; vw-wm=very weak to weak to medium; vw-w=very weak to weak):

TABLE I

| d(A) | Intensity |
| --- | --- |
| 16.4 +/− 0.2 | vs |
| 12.4 +/− 0.2 | vw |
| 8.2 +/− 0.1 | vw-wm |
| 4.6 +/− 0.1 | vw-w |
| 4.27 +/− 0.05 | vw-w |
| 4.12 +/− 0.05 | vw-w |
| 4.09 +/− 0.05 | vw-w |
| 4.01 +/− 0.05 | vw-w |
| 3.96 +/− 0.05 | vw-w |
| 3.58 +/− 0.05 | vw-w |
| b 3.43 +/− 0.03 | vw-w |
| 3.26 +/− 0.03 | vw-w |
| b 3.09 +/− 0.03 | vw-w |
| 2.75 +/− 0.03 | vw |
| 2.72 +/− 0.03 | vw |

EXAMPLE II

The experiment described in Example I was repeated but using a smaller amount of silica-sol; so as to give a reaction gel mixture (on a molar basis) of $0.1SiO_2:0.5Al_2O_3:1P_2O_5:1C8DN:80H_2O$.

This mixture was kept at 140° C. for 72 hours until a crystalline compound was obtained. After synthesis, the crystalline compound was separated from the reaction mixture by filtration, water washed and dried at 120° C.

The crystalline compound obtained has the following chemical composition, wherein R represents C8DN:

0.60R(1$P_2O_5$)(0.92$Al_2O_3$)(0.08$SiO_2$)(0.3$H_2O$) and has an X-ray diffraction pattern consistent with that given in Table I.

EXAMPLE III

A crystalline SAPO, referred to as SCS-22, was prepared by mixing 51.1 grams of aluminum tri-isopropoxide, 11.7 grams of silica-sol (Ludox AS), 57.6 grams of 85% $H_3PO_4$, 36.1 grams of C8DN and 330.7 grams of water giving a reaction gel mixture (on a molar basis) of 0.3$SiO_2$:0.5$Al_2O_3$:1$P_2O_5$:1C8DN:80$H_2O$.

This mixture was kept at 140° C. for a period of 7 hours until a crystalline compound was obtained.

After synthesis, the crystalline compound produced was separated from the reaction mixture by filtration, water washed, and dried at 120° C. Its X-ray diffraction pattern is consistent with that given in Table I.

EXAMPLE IV

A crystalline CoAPSO was prepared in an experiment which was carried out in a substantially analogous manner as described in Example III, by mixing 20.4 grams of aluminum tri-isopropoxide, 4.7 grams of silica-sol (Lodox AS), 23.1 grams of 85% $H_3PO_4$, 14.4 grams of C8DN, 130 grams of $H_2O$ and additionally 7.5 grams of Co($CH_3$COO)$_2$.4$H_2O$ giving a reaction gel mixture (on a molar basis) of 0.3$SiO_2$:0.3CoO:0.5$Al_2O_3$:1$P_2O_5$:1C8DN:80$H_2O$.

This mixture was kept at 110° C. for a period of 72 hour under gentle rotation until a crystalline compound was obtained. After synthesis, the crystalline compound produced was separated from the reaction mixture by filtration, water washed and dried at 120° C.

The crystalline compound has the following chemical composition wherein R represents C8DN:

0.54R(0.44CoO)(1$P_2O_5$)(0.69$Al_2O_3$)(0.34 $SiO_2$)(0.3$H_2O$) and has an X-ray diffraction pattern consistent with that given in Table I.

EXAMPLE V

The experiment described in the previous Example was repeated at a temperature of 140° C. and using 3.7 grams of pseudo-boehmite as the aluminum source.

After working up, an SCS-22 type CoAPSO was obtained having the following chemical composition, wherein R represents C8DN:

0.66R(0.25CoO)(1$P_2O_5$)(0.75$Al_2O_3$)(0.18$SiO_2$)(0.22-$H_2O$) and an X-ray diffraction pattern consistent with that given in Table I.

EXAMPLE VI

The experiment described in the previous Example was repeated but using aluminum tri-isopropoxide as the aluminum source, a synthesis temperature of 120° C. and an amount of cobalt (II) acetate tetrahydrate giving 0.2 mole of CoO per mole $P_2O_5$ in the starting reaction mixture.

After working up, an SCS-22 type CoAPSO was obtained having the following chemical composition, wherein R represents C8DN:

0.57R(0.09CoO)(1$P_2O_5$)(0.61$Al_2O_3$)(0.30$SiO_2$)(0.25-$H_2O$) and an X-ray diffraction pattern consistent with that given in Table I.

EXAMPLE VII

The experiment described in the previous Example was repeated while stirring the reaction gel mixture for a period of 21.5 hours. After working up, a crystalline product was obtained having an X-ray pattern consistent with that given in Table I.

EXAMPLE VIII

The experiment as described in Example IV was repeated at a temperature of 120° C. for a period of 72 hours and using 1,10-diaminodecane (C10DN) as the template/structure directing agent.

The crystalline compound obtained has the following chemical composition, wherein R represents C10DN:

0.90R(0.45CoO)(1$P_2O_5$)(0.64$Al_2O_3$)(0.41$SiO_2$)(0.3-$H_2O$) and has an X-ray diffraction pattern containing at least the lines given in Table II:

TABLE II

| d(A) | Intensity |
| --- | --- |
| 18.4 | vs |
| 9.2 | w |
| 4.59 | vw |
| 3.68 | vw |
| 3.06 | vw |

EXAMPLE IX

The experiment described in the previous Example was repeated but using 1,12-diaminododecane (C12DN) as template/structure directing agent.

The crystalline compound obtained has the following chemical composition, wherein R represents C12DN:

0.94R(0.42CoO)(1$P_2O_5$)(0.64$Al_2O_3$)(0.37$SiO_2$)(0.3-$H_2O$) and has an X-ray diffraction pattern containing at least the lines given in Table III:

TABLE III

| d(A) | Intensity |
| --- | --- |
| 20.2 | vs |
| 18.7 | w |
| 5.04 | vw |
| 4.03 | vw |
| 3.35 | vw |

What is claimed is:

1. Crystalline aluminophosphates having in the assynthesised dried form the chemical composition expressed as:

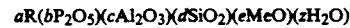

$aR(bP_2O_5)(cAl_2O_3)(dSiO_2)(eMeO)(zH_2O)$ wherein a is 0.5–1, b is 1, c is 0.4–0.95, d is 0–0.25, e is 0–0.4 and z is at least 0.1, and wherein R represents a diamine of the general formula

$R_2R_3N-R_1-NR_4R_5$ wherein $R_1$ represents a $C_8-C_{14}$ carbon chain which may contain one or more inert substituents and each of $R_2$, $R_3$, $R_4$ and $R_5$ represents a hydrogen atom or an alkyl group which may contain one or more inert substituents and Me represents a divalent metal moiety, wherein a:b=0.5–1

(c+e):b=0.5–0.9
d:b=0–0.25
(c+e):a=0.8–1.2 and
z:b at least 0.1,
and having an X-ray diffraction pattern containing at least the lines given in Table I:

TABLE I

| d(A) | Intensity |
|---|---|
| 16.4 +/− 0.2 | vs |
| 12.4 +/− 0.2 | vw |
| 8.2 +/− 0.1 | vw-wm |
| 4.6 +/− 0.1 | vw-w |
| 4.27 +/− 0.05 | vw-w |
| 4.12 +/− 0.05 | vw-w |
| 4.09 +/− 0.05 | vw-w |
| 4.01 +/− 0.05 | vw-w |
| 3.96 +/− 0.05 | vw-w |
| 3.58 +/− 0.05 | vw-w |
| b 3.43 +/− 0.03 | vw-w |
| 3.26 +/− 0.03 | vw-w |
| b 3.09 +/− 0.03 | vw-w |
| 2.75 +/− 0.03 | vw |
| 2.72 +/− 0.03 | vw. |

2. The crystalline aluminophosphates according to claim 1, wherein
a:b=0.5–1
(c+e):b=0.5–0.8
d:b=0–0.25
(c+e):a=0.8–1.2 and
z:b at least 0.2.

3. The crystalline aluminophosphates according to claim 1, wherein $R_1$ represents a $C_8$ carbon chain.

4. The crystalline aluminophosphates according to claim 1, wherein each of $R_2$, $R_3$, $R_4$ and $R_5$ represents a hydrogen atom or a lower alkyl group.

5. The crystalline aluminophosphates according to claim 3, wherein R represents 1,8-diaminooctane.

6. The crystalline aluminophosphates according to claim 1, wherein Me represents a metal selected from the group consisting of beryllium, magnesium, manganese, iron, cobalt, zinc, nickel, chromium and mixtures thereof.

7. The crystalline aluminophosphates according to claim 6, wherein Me represents a metal selected from the group consisting of magnesium, manganese, iron, cobalt, zinc, nickel and mixtures thereof.

8. The crystalline aluminophosphates according to claim 7, wherein Me is a metal selected from the group consisting of magnesium, manganese, cobalt, zinc, and mixtures thereof.

9. The crystalline aluminophosphates according to claim 1, wherein said crystalline aluminophosphates are in a substantially R-free form.

10. The crystalline aluminophosphates according to claim 1, wherein one or more catalytically active species have been incorporated into said crystalline aluminophosphates.

11. The crystalline aluminophosphates of claim 10 wherein said catalytically active species is selected from the group consisting of protons, precursors of protons, transition metal compounds, rare earth metal compounds and mixtures thereof.

12. A process for preparing crystalline aluminophosphates having in the as-synthesised dried form the chemical composition expressed as:

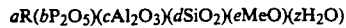

wherein a is 0.5–1, b is 1, c is 0.4–0.95, d is 0–0.25, e is 0–0.4 and z is at least 0.1, and wherein R represents a diamine of the general formula

wherein $R_1$ represents a $C_8$–$C_{14}$ carbon chain which may contain one or more inert substituents and each of $R_2$, $R_3$, $R_4$ and $R_5$ represents a hydrogen atom or an alkyl group which may contain one or more inert substituents and Me represents a divalent metal moiety, wherein
a:b=0.5–1
(c+e):b=0.5–0.9
d:b=0–0.25
(c+e):a=0.8–1.2 and
z:b at least 0.1,
from a forming solution or gel comprising a source of aluminum, a source of phosphorus, with or without a source of at least one moiety MeO, and a source based on a diamine, which mixture is kept at a temperature below about 200° C. for a period of time sufficient to produce a crystalline aluminophosphate, followed by separating off the crystalline product obtained and drying, in which solution or gel the various components are initially present in the following molar ratios:
$R:Al_2O_3$=0.1–3
$MeO:Al_2O_3$=0–2
$P_2O_5:Al_2O_3$= >1.3 and
$H_2O:Al_2O_3$=40–500,
wherein said crystalline aluminophosphate has an X-ray diffraction pattern containing at least the lines given in Table I:

TABLE I

| d(A) | Intensity |
|---|---|
| 16.4 +/− 0.2 | vs |
| 12.4 +/− 0.2 | vw |
| 8.2 +/− 0.1 | vw-wm |
| 4.6 +/− 0.1 | vw-w |
| 4.27 +/− 0.05 | vw-w |
| 4.12 +/− 0.05 | vw-w |
| 4.09 +/− 0.05 | vw-w |
| 4.01 +/− 0.05 | vw-w |
| 3.96 +/− 0.05 | vw-w |
| 3.58 +/− 0.05 | vw-w |
| b 3.43 +/− 0.03 | vw-w |
| 3.26 +/− 0.03 | vw-w |
| b 3.09 +/− 0.03 | vw-w |
| 2.75 +/− 0.03 | vw |
| 2.72 +/− 0.03 | vw. |

13. The process according to claim 12, wherein the components in the forming solution or gel are initially present in the following molar ratios:
$R:Al_2O_3$=0.15–2
$MeO:Al_2O_3$=0–2
$P_2O_5:Al_2O_3$=at least 1.5 and
$H_2O:Al_2O_3$=45–320.

14. The process according to claim 12, wherein said source of aluminum selected from the group consisting of an aluminum oxide, an aluminum hydroxide, an aluminum alkoxide and mixtures thereof.

15. The process according to claim 13, wherein said source of aluminum is aluminum tri-isopropoxide.

16. The process according to claim 12, wherein said source of phosphorus is selected from the group consisting of phosphorus acids, phosphorus oxides, phosphates and phosphites.

17. The process according to claim 16, wherein said source based on a diamine is 1,8-diaminooctane.

18. The process according to claim 12, wherein use is made of a precursor of MeO in the form of a chloride, iodide, bromide, sulfate, nitrate or acetate.

* * * * *